United States Patent [19]

Valleroy

[11] Patent Number: 5,615,549
[45] Date of Patent: Apr. 1, 1997

[54] THRUST REVERSER FOR A FAN-TYPE TURBOJET ENGINE

[75] Inventor: Laurent G. Valleroy, Le Havre, France

[73] Assignee: Societe Hispano-Suiza, Saint Cloud Cedex, France

[21] Appl. No.: 499,295

[22] Filed: Jul. 7, 1995

[30] Foreign Application Priority Data

Jul. 13, 1994 [FR] France .................. 94 08704

[51] Int. Cl.⁶ .................................................. F02K 3/02
[52] U.S. Cl. ........................ 60/226.2; 239/265.27; 244/110 B
[58] Field of Search .............. 60/226.2; 239/265.19, 239/265.25, 265.27; 244/110 B

[56] References Cited

U.S. PATENT DOCUMENTS

| 4,005,836 | 2/1977 | Mutch | 239/265.19 |
|---|---|---|---|
| 4,858,430 | 8/1989 | Belbouche . | |
| 4,865,256 | 9/1989 | Durand et al. . | |
| 4,894,985 | 1/1990 | Dubois et al. . | |
| 4,914,905 | 4/1990 | Dubois et al. . | |
| 4,916,895 | 4/1990 | Dubois . | |
| 4,960,243 | 10/1990 | Dubois et al. . | |
| 4,976,466 | 12/1990 | Vauchel . | |
| 5,039,171 | 8/1991 | Lore . | |
| 5,054,285 | 10/1991 | Geidel et al. | 60/266.2 |
| 5,058,828 | 10/1991 | Pillari . | |
| 5,230,213 | 7/1993 | Lawson | 60/226.2 |
| 5,284,015 | 2/1994 | Carimali et al. . | |

FOREIGN PATENT DOCUMENTS

| 2081954 | 12/1971 | France . |
|---|---|---|
| 0315522 | 5/1989 | France . |
| 0534815 | 9/1992 | France . |
| 2142887 | 1/1985 | United Kingdom . |

Primary Examiner—Charles G. Freay
Attorney, Agent, or Firm—Bacon & Thomas

[57] ABSTRACT

A thrust reverser for a fan-type turbojet engine is disclosed for use in a turbojet engine structure having an engine housing defining a primary gas flow duct and a fan housing generally coaxially arranged about the jet engine housing and defining therebetween a generally annular secondary gas flow duct. The thrust reverser has at least one thrust reverser door attached to the fan housing by a forward linkrod pivotally attached to a forward portion of the thrust reverser door and pivotally attached to the fan housing, and a rear linkrod pivotally attached to a rear portion of the thrust reverser door and also pivotally attached to the engine housing. The linkrod attaching mechanism enables the thrust reverser door to be movable between a forward thrust position wherein the door outer surface is substantially flush with an outer surface of the fan housing and a reverse thrust position wherein the thrust reverser door redirects the gases flowing through the secondary gas flow duct to provide a reverse thrust.

11 Claims, 6 Drawing Sheets

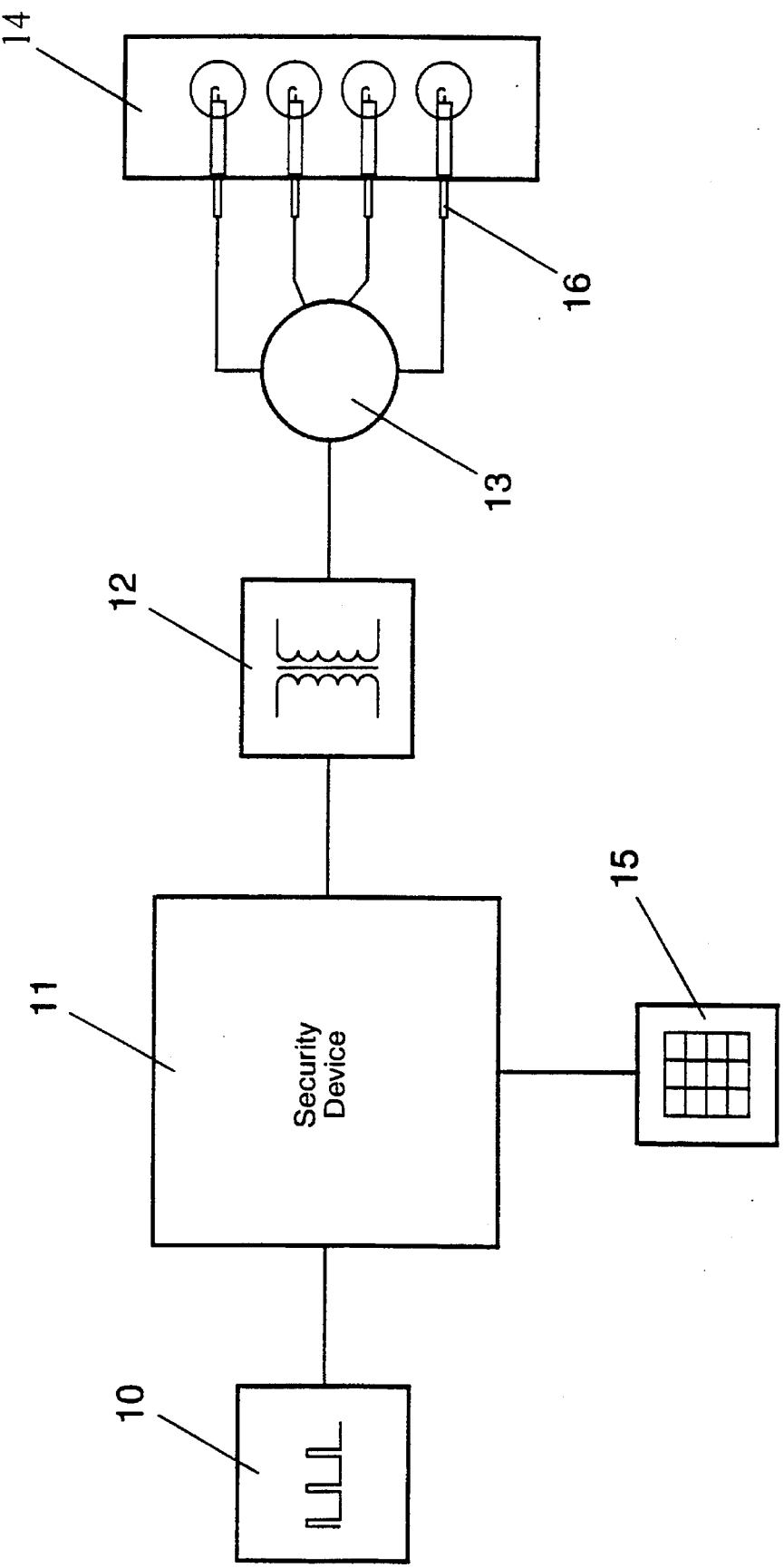

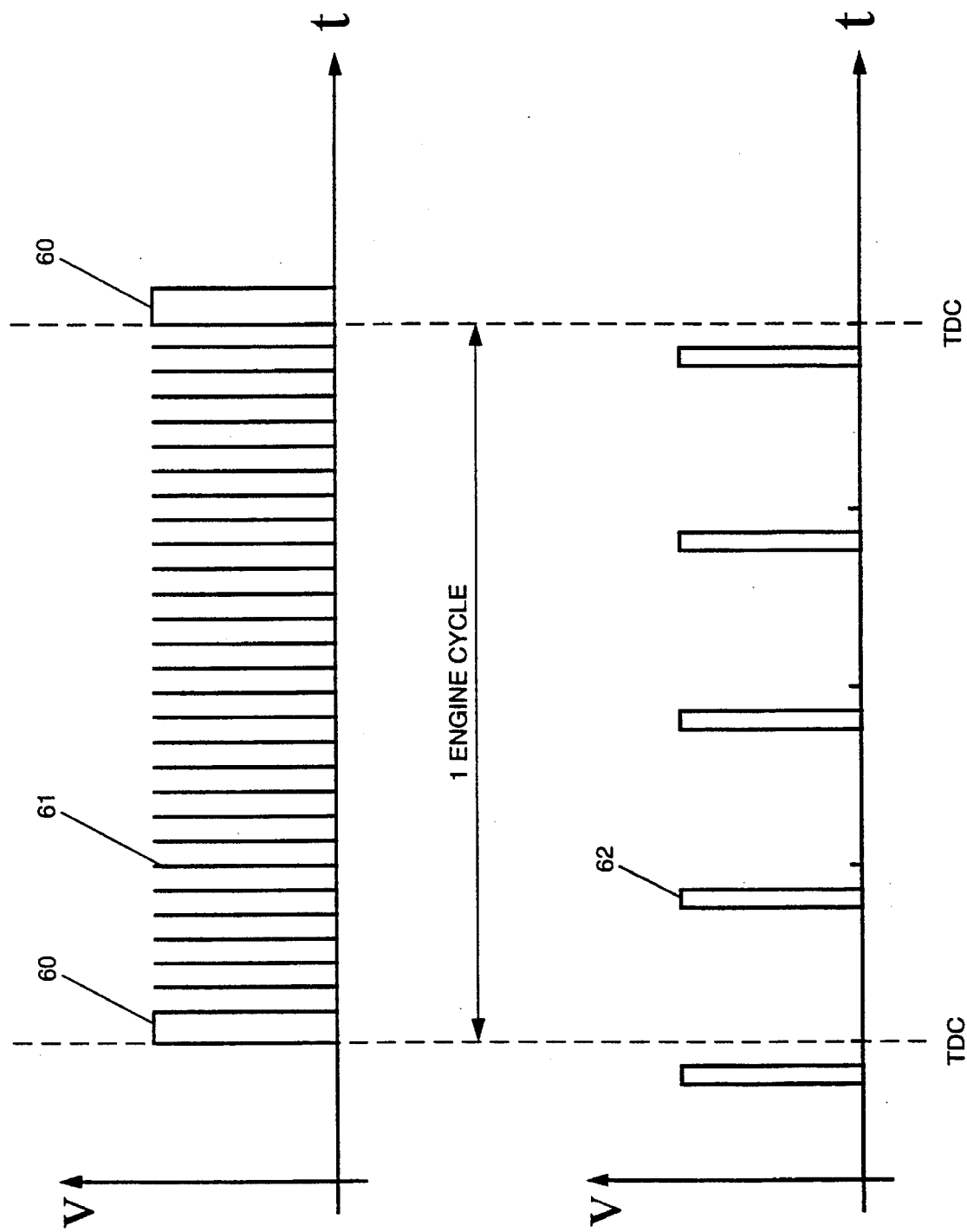

THRUST REVERSER FOR A FAN-TYPE TURBOJET ENGINE

BACKGROUND OF THE INVENTION

The present invention relates to a thrust reverser for a fan-type turbojet engine, more particularly such an engine having a fan housing that is axially shorter than the turbojet engine housing wherein the thrust reverser doors are located on the fan housing.

Fan-type turbojet engines are well known in the art and typically comprise a jet engine housing defining a primary gas flow duct through which pass hot gases emanating from the jet engine and a fan housing generally coaxially arranged around the engine housing and defining therebetween a generally annular secondary gas flow duct through which pass cold gases from the fan. It is also known to incorporate thrust reversers in such engine structures and, particularly wherein the fan-type engine is of the high bypass ratio type, it is known to have the thrust reversers acting solely or primarily on the gases passing through the secondary gas flow duct.

FIG. 1 of the attached drawings illustrates a known thrust reverser design comprising a forward, or upstream, stationary structure 1 which forms an outer boundary of the secondary gas flow duct, a movable portion 2 and a stationary rear, or downstream, annulus 3. The stationary forward structure 1 comprises an outer panel 4, an inner panel 5 having a deflecting edge 8 and which forms the external boundary of the secondary gas flow duct. A front frame 6 interconnects the outer and inner panels 4 and 5, respectively. The frame 6 also supports an actuating system which drives the movable portion 2 between its forward thrust position (illustrated in FIG. 1) and its reverse thrust position (illustrated in FIG. 2). The movable portion 2 typically comprises thrust reverser doors 7, the number of which may vary in relation to each particular application and typically comprises two, three or four such doors 7 which together subtend an annular assembly which cooperates with the stationary portion of the engine.

FIG. 2 is a partial perspective view of a known thrust reverser system used in a bypass-type turbojet engine wherein the thrust reverser comprises four doors 7, two of which are illustrated in FIG. 2 in their open, or reverse, thrust positions. Each door is connected to a control means such as an actuator 7a to move it between its forward thrust position and its reverse thrust position.

Illustrative designs of turbojet engine thrust reversers with pivoting thrust reverser doors can be found in the following U.S. Pat. Nos. 4,894,985; 4,858,430; 4,916,895; 4,914,905; 4,976,466; 4,960,243; and 5,039,171.

Although the known designs of movable door thrust reversers have been generally satisfactory, in certain applications, these known types have encountered substantial difficulties, and under certain conditions, may be impossible to use. In jet engine assemblies with very high bypass ratios and wherein the fan housing is substantially axially shorter than the jet engine housing so as to provide an axially short secondary flow duct corresponding to the separate flow mode of operation, the use of known thrust reverser door systems have proven unsuitable.

SUMMARY OF THE INVENTION

A thrust reverser for a fan-type turbojet engine is disclosed for use in a turbojet engine structure having an engine housing defining a primary gas flow duct and a fan housing generally coaxially arranged about the jet engine housing and defining therebetween a generally annular secondary gas flow duct. The thrust reverser has at least one thrust reverser door attached to the fan housing by a forward linkrod pivotally attached to a forward portion of the thrust reverser door and pivotally attached to the fan housing, and a rear linkrod pivotally attached to a rear portion of the thrust reverser door and also pivotally attached to the engine housing. The linkrod attaching mechanism enables the thrust reverser door to be movable between a forward thrust position wherein the door outer surface is substantially flush with an outer surface of the fan housing and a reverse thrust position wherein the thrust reverser door redirects the gases flowing through the secondary gas flow duct to provide a reverse thrust.

The turbojet engine thrust reverser according to the present invention is characterized in that at least an upstream or forward portion of each thrust reverser door when in the forward thrust position, covers an inner part of the fan housing which forms an outer boundary of the secondary flow duct such that the outer surface of the thrust reverser door is substantially flush with the outer surface of the fan housing. Each thrust reverser door is associated with at least one upstream or forward linkrod and at least one downstream or rear linkrod such that the linkrods ensure that the thrust reverser door is held in place, supported, and displaced properly.

In a first embodiment, the thrust reverser door has a rearmost edge which is substantially coincident with the rearmost end of the fan housing, the rearmost edge portion is located in extension of an inner surface of the fan housing which defines an outer boundary of the secondary flow duct when the thrust reverser door is in its forward thrust position.

In a second embodiment, the fan housing has an inner rear edge portion which extends rearwardly of the thrust reverser door whereby the thrust reverser door overlies the rear edge portion when in the forward thrust position. As in the first embodiment, the outer surface of the thrust reverser door is substantially flush with the outer surface of the fan housing when the thrust reverser door is in its forward thrust position. When the thrust reverser door is in its reverse thrust position, the downstream or rear edge portion of the fan housing defines a boundary of a reverse thrust passage through which the secondary flow gases are directed by the thrust reverser door.

BRIEF DESCRIPTION OF THE DRAWING

FIG. 1 is a partial, longitudinal cross-sectional view illustrating a known thrust reverser door in the forward thrust position.

FIG. 6 is a partial, cross-sectional view taken along line VI—VI in FIG. 5.

FIG. 7 is a cross-sectional view taken along line VII—VII in FIG. 6.

FIG. 8 is a cross-sectional view similar to FIG. 7, but illustrating the thrust reverser door in its reverse thrust position.

FIG. 9 is a side view of a second embodiment of the thrust reverser according to the present invention with the thrust reverser doors in their forward thrust positions.

FIG. 10 is a cross-sectional view of the thrust reverser illustrated in FIG. 9 wherein the upper portion of FIG. 10 illustrates the thrust reverser door in its forward thrust position and the lower half of FIG. 10 illustrates the thrust reverser door in its reverse thrust position.

FIG. 11 is a partial side view of the thrust reverser door according to the invention illustrating the thrust reverser doors in their reverse thrust positions.

FIG. 12 is a partial, cross-sectional view illustrating the thrust reverser of FIG. 11 with the thrust reverser door in its reverse thrust position.

DETAILED DESCRIPTION OF THE PREFERRED EMBODIMENTS

Figure 2B:
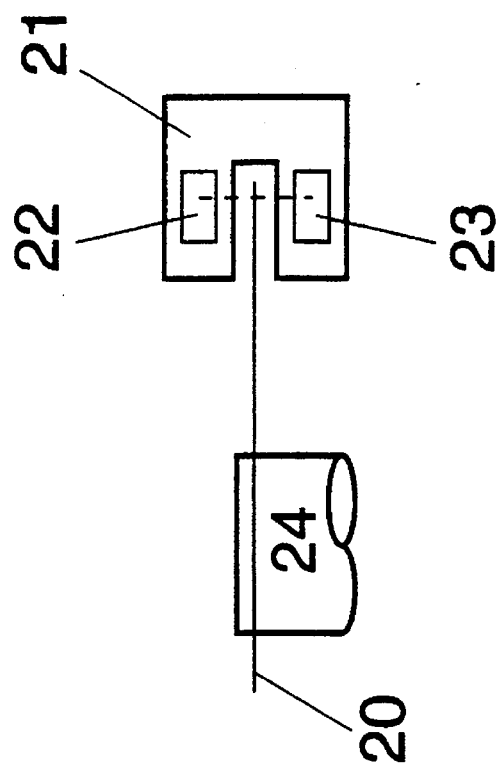
FIG. 2 is a partial, perspective view illustrating the known thrust reverser with the thrust reverser doors in their reverse thrust positions.
Figure 2A:
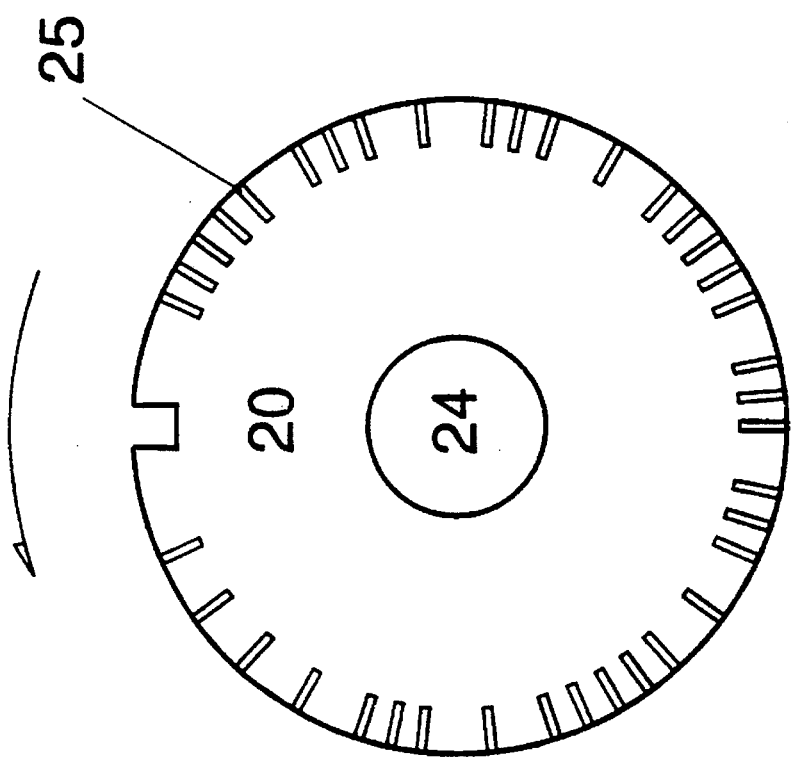
Figure 3:
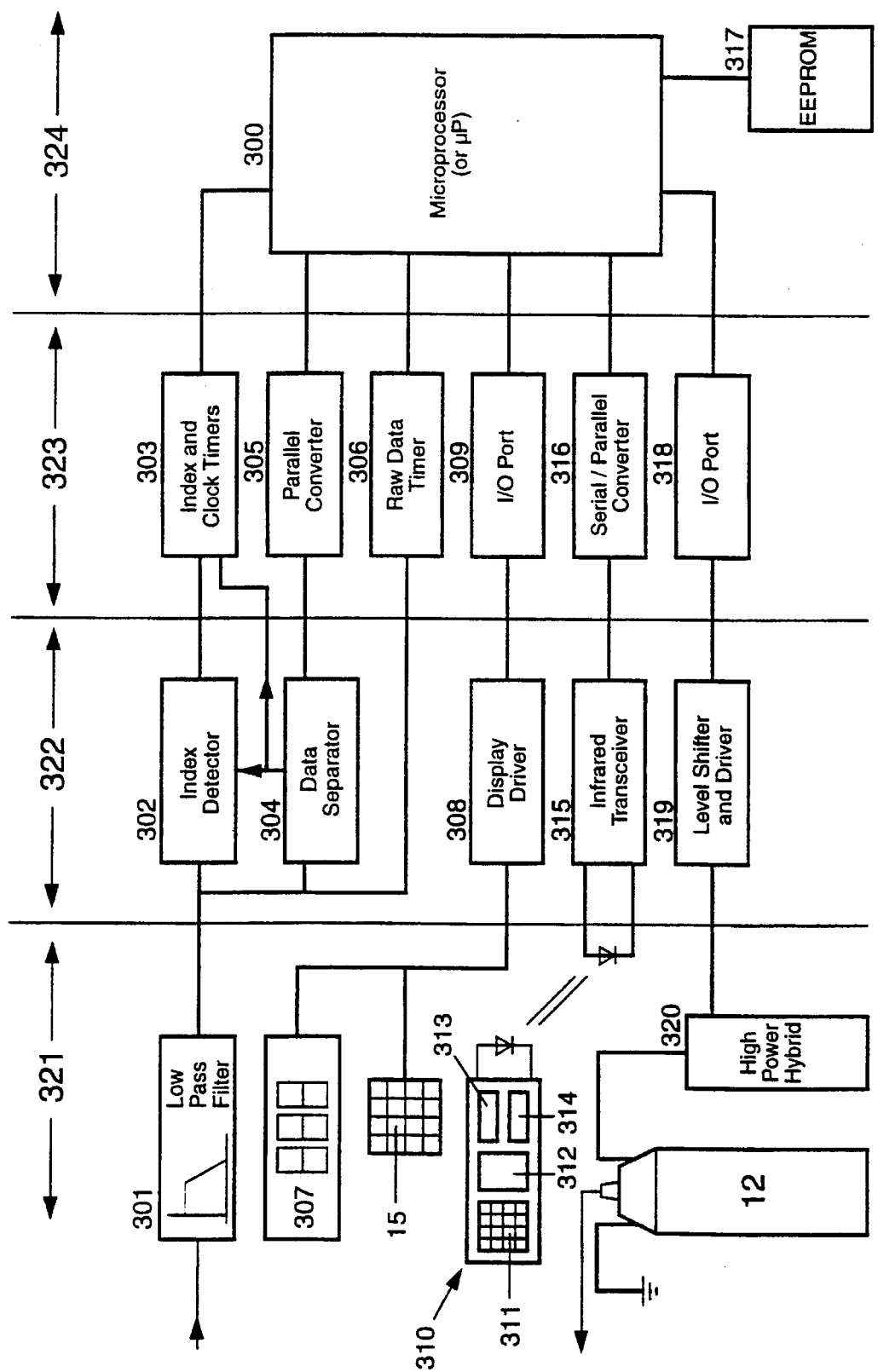
FIG. 3 is a side view of a first embodiment of the thrust reverser according to the invention with the thrust reverser doors in their forward thrust positions.

FIG. 3 illustrates an application of a thrust reverser according to the present invention to a very high bypass turbojet engine 11. In the embodiment shown, the turbojet engine 11 is mounted in known manner beneath an aircraft wing 12 in a forward position by means of a pylon 13. This assembly has a fan 14 forming an outer boundary of a secondary gas flow duct 15 through which circulates the secondary, or cold flow, gases from the fan of the turbojet engine, the secondary duct 15 integrating the turbojet engine fan duct. In this particular application, the axial length of the fan 14 is significantly shorter than the axial length of the housing for the turbojet engine 11 and corresponds to the known separate flow operation.

Figures 4A, 4B, 4C:
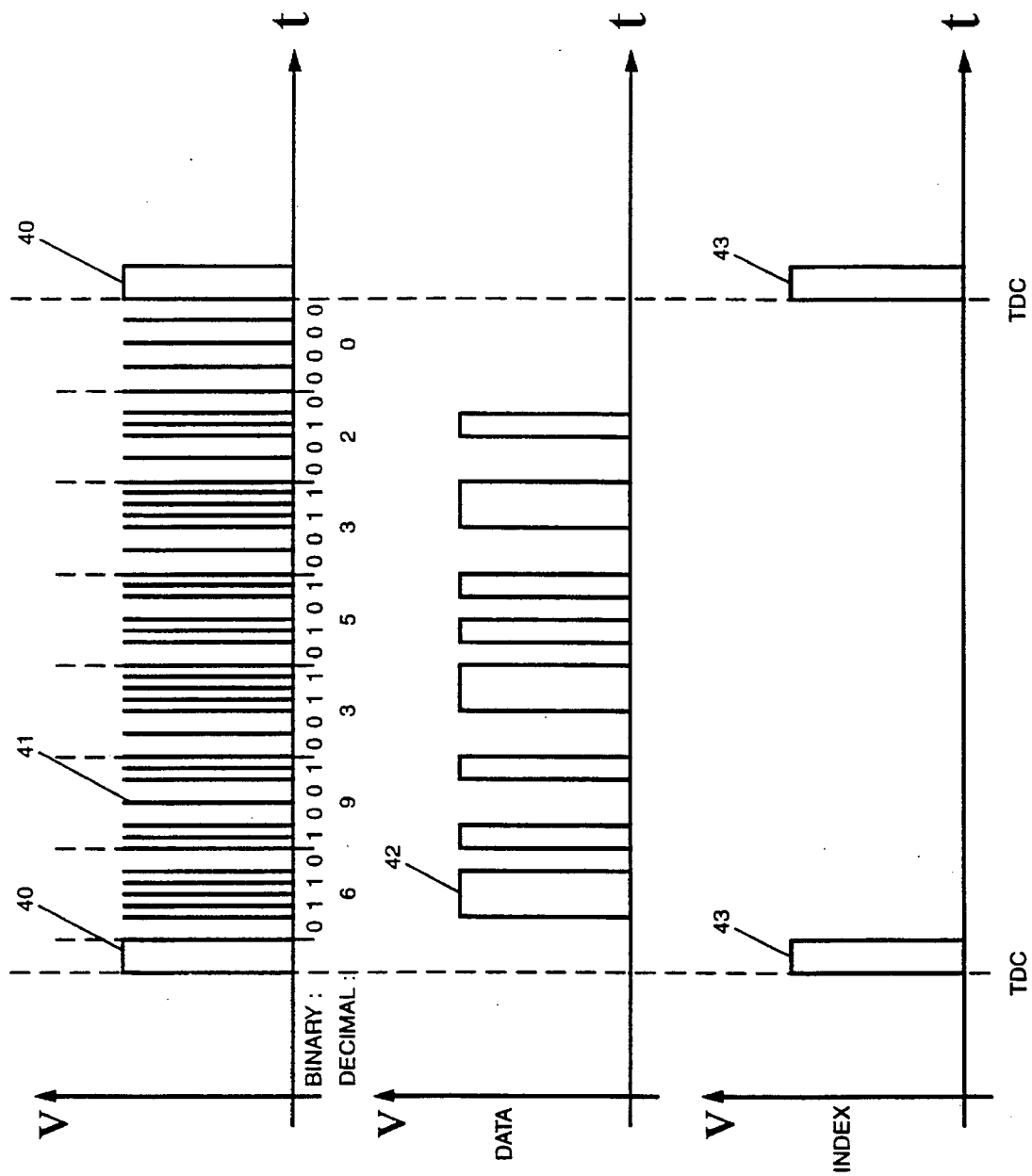
FIG. 4 is a partial, rear view of the thrust reverser of FIG. 3 with the thrust reverser doors in their reverse thrust positions.

The fan 14 mounts the thrust reverser 16 of which the movable part of the embodiment shown comprises four displaceable doors 17. The thrust reverser 16 is illustrated in more detail in FIGS. 4-8. FIG. 3 illustrates the thrust reverser doors 17 in their closed, forward thrust positions, while in FIG. 4, the thrust reverser doors 17 are illustrated in their extended, reverse thrust positions wherein the secondary flow through the duct 15 is deflected forward by the thrust reverser doors 17 thereby generating a reverse thrust.

Figure 5:
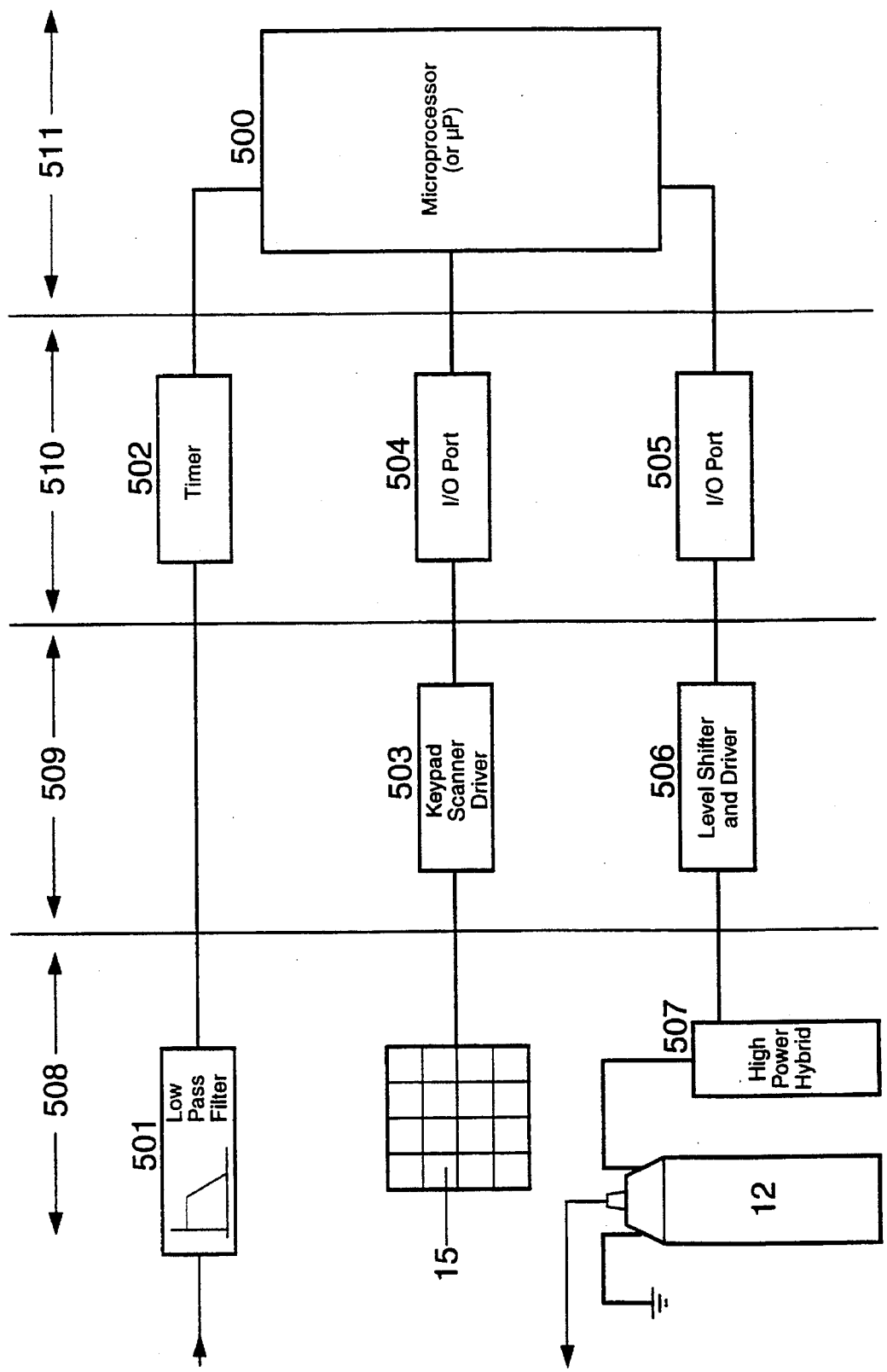
FIG. 5 is a longitudinal, schematic, cross-sectional view of the thrust reverser of FIG. 3 with the upper half of FIG. 5 illustrating the thrust reverser door in its forward thrust position and the lower half of FIG. 5 illustrating the thrust reverser door in its reverse thrust position.

As illustrated in FIG. 3 and in the upper half of FIG. 5, when in the forward thrust positions, the outer surface 18 of each thrust reverser door 17 is substantially flush with the outer surface 19 of the fan housing 20. A forward portion 21 of the thrust reverser door 17 externally covers a rear edge portion 22 of the fan housing 20 and a rearward portion 23 of the thrust reverser door 17 is located rearwardly of the rear edge portion 22. The use of the terms "upstream" and "downstream" are to be considered in the normal direction of gas flow through the turbojet engine which is from left to fight, or from front to rear, as illustrated by arrow 26 in FIG. 5. An inner surface 24 on the rearward portion 23 of the movable thrust reverser door 17 forms a continuation of the inner surface 25 on the rear edge portion 22, thereby externally bounding the secondary gas flow duct 15.

Each thrust reverser door 17 is pivotally attached to at least one downstream or rear linkrod 27 pivotally attached to a rear portion of the thrust reverser door 17 at pivot 28 and also pivotally attached to the jet engine housing 30 at pivot connection 29. The thrust reverser door 17 is also mounted by two upstream or forward linkrods 36 (best seen in FIGS. 7 and 8) which are pivotally attached to a forward portion of the thrust reverser 17 by pivot connection 31 and which are pivotally attached to the rear portion 22 of the fan housing by pivot connection 32. The linkrods 36 and 27 hold the thrust reverser doors 17 in place and guide the doors during their displacement between the forward thrust and reverse thrust positions. Although the invention will be described in terms of having two forward linkrods and one rear linkrod, it is to be understood that different numbers of the two linkrods may be utilized depending upon each specific application without exceeding the scope of this invention.

The rear edge portion 22 of the fan housing comprises a deflection edge 33 which forms an upstream or forward boundary of a reverse thrust passage when the thrust reverser door 17 is in its reverse thrust position as illustrated in the lower portion of FIG. 5. The shape of the deflection edge 33 may be specific to each particular application in order to direct the flow of thrust reversing gases away from adjacent aircraft structure to prevent damage to the aircraft structure during reverse thrust operations. The thrust reverser doors 17 may also have cutoff corners, such as at 34 and 35 in FIG. 4, to further control the direction and flow of the thrust reversing gases to prevent damage to adjacent aircraft structure.

In a variation of the aforedescribed embodiment, a known cam system may be incorporated into the pivot attachment 29 affixing the rear linkrod 27 to the jet engine housing 30 so that, when in the forward thrust position, the cross-sectional area of the exit of the secondary gas flow duct 15 may be varied in relation to the inner surface 24 of the rear edge portion 23 of the thrust reverser door 17.

The description of the above embodiment illustrates four thrust reverser doors 17. It is to be understood that differing numbers of thrust reverser doors may be utilized depending upon the specific application without exceeding the scope of this invention.

Variations of the aforedescribed embodiment may also be carried out depending upon each specific application. The thrust reverser doors 17 may be attached by two rear linkrods for each thrust reverser door and by one or two forward link rods. Depending upon the application and the desired operational mode, the linkrod configuration allows balancing the thrust reverser doors so that they are self-opening or self-closing, depending upon the force distributions. A known locking system may also be added to the thrust reverser baffles to lock them in their desired positions.

A second embodiment of the present invention is illustrated in FIGS. 9 and 10 wherein the thrust reverser 16 is fitted to a bypass-type turbojet engine 11, again mounted by a pylon 13 beneath aircraft wing 12. The thrust reverser 16 comprises a plurality of thrust reverser doors 37 mounted to the fan 14. As illustrated in the upper half of FIG. 10, when in the forward thrust position, the outer surface 18 of the thrust reverser door 37 is substantially flush with the outer surface 19 of the fan housing 20. In this embodiment, the thrust reverser door 37 is housed in its entirety within the fan housing 20 and covers an inner, rear edge portion 38, the rear edge area 38a of which is located rearwardly of the rear end of the thrust reverser door 37. The rear edge area 38a has an outer surface which is substantially flush with the outer surface 18 of the thrust reverser door 37. This portion also has an inner surface which forms an outer boundary of the secondary flow duct 15. In the forward thrust position, the rear edge 41 of rear edge area 38a comprises a trailing edge and in the reverse thrust position. As illustrated in the lower half of FIG. 10, it constitutes a deflection edge which forms a boundary of the thrust reverse passage between the fan housing and the thrust reverser door 37.

The attachment of the thrust reverser doors 37 to the fan housing and to the jet engine housing 30 is identical to the previously described embodiment. This attachment may take the form of one or more linkrods 27 pivotally attached at 28 and 29, to the thrust reverser door 37 and to the jet engine housing 30, respectively, and forward linkrod pivotally attached to the thrust reverser door 37. The thrust reverser 37 may also be formed with cutoff corners as at 34 and 35 of the previously described embodiment.

FIG. 11 illustrates another embodiment of the thrust reverser according to the present invention with the thrust reverser doors 17a in their reverse thrust positions. As previously described, the thrust reverser doors 17a are pivotally attached to the jet engine housing by rear linkrod 27 and by two forward linkrods 36 and 36a. As shown in FIGS. 11 and 12, link rod 36a may be shorter in length than linkrod 36. As a result, the thrust reverser doors 17a will slope laterally with respect to the longitudinal axis when in their thrust reversing positions so as to control the direction of flow of the gases during thrust reversal. Accordingly, by adjusting the linkrod positions and their relative lengths, the amount of slope and the positions of the thrust reverser doors 17a when their thrust reversing positions may be accurately controlled so as to direct the flow of thrust reversing gases away from adjacent aircraft structures.

The foregoing description is provided for illustrative purposes only and should not be construed as in any way limiting this invention, the scope of which is defined solely by the appended claims.

What is claimed is:

1. A thrust reverser for a fan-type turbojet engine having an engine housing having a primary gas flow duct with a first rearmost end, a fan housing generally coaxial with the engine housing and defining therebetween a generally annular secondary gas flow duct, the fan housing having an outer surface and a second rearmost end portion located forwardly of the first rearmost end, the thrust reverser comprising:

a) at least one thrust reverser door having a door outer surface, a front end and a rear end;
   b) at least one fixed length forward linkrod pivotally attached to a forward portion of the at least one thrust reverser door and pivotally attached to the fan housing so as to pivot about a fixed axis; and,
   c) at least one rear linkrod pivotally attached to a rear portion of the at least one thrust reverser door and pivotally attached to the engine housing whereby the at least one thrust reverser door is movable between a forward thrust position wherein the door outer surface is substantially flush with the outer surface of the fan housing and a reverse thrust position wherein the at least one thrust reverser door redirects gases flowing through the secondary gas flow duct to provide a reverse thrust.

2. The thrust reverser of claim 1 further comprising a plurality of thrust reverser doors attached to the fan housing.

3. The thrust reverser of claim 1 wherein the at least one thrust reverser door comprises a rearmost edge substantially coincident with the second rearmost end portion of the fan housing.

4. The thrust reverser of claim 1 wherein the second rearmost end portion further comprises an inner surface of the fan housing which defines an outer boundary of the secondary gas flow duct extending inwardly of the at least one thrust reverser door substantially along the distance between the front and rear ends of the at least one thrust reverser door.

5. The thrust reverser of claim 4 wherein the inner surface comprises a rear edge portion which extends rearwardly of the rear end of the at least one thrust reverser door wherein the rear edge portion forms a boundary of a reverser thrust passage when the at least one thrust reverser door is in the reverse thrust position.

6. The thrust reverser of claim 1 wherein the at least one forward linkrod is pivotally attached to the second rearmost end portion of the fan housing.

7. The thrust reverser of claim 1 wherein the at least one rear linkrod is pivotally attached to the rear end of the at least one thrust reverser door.

8. The thrust reverser of claim 1 wherein the at least one forward linkrod comprises a pair of linkrods.

9. The thrust reverser of claim 8 wherein the at least one thrust reverser door has opposite side edge portions and wherein the pair of forward linkrods are pivotally attached to the opposite side edge portions.

10. The thrust reverser of claim 9 wherein the side edge portions are oriented obliquely to a longitudinal axis of the turbojet engine when the at least one thrust reverser door is in the reverse thrust position.

11. The trust reverser of claim 9 wherein a length of one of the pair of forward linkrods is different than a length of the other of the pair of forward linkrods.

* * * * *

UNITED STATES PATENT AND TRADEMARK OFFICE
CERTIFICATE OF CORRECTION

PATENT NO.   : 5,615,549
DATED        : April 1, 1997
INVENTOR(S)  : Valleroy

It is certified that error appears in the above-identified patent and that said Letters Patent is hereby corrected as shown below:

The title page, showing the illustrative figure, should be deleted and substitute the attached title page.

Please delete "Figures 1-6B" and substitute therefore --Figures 1-12--.

Signed and Sealed this

Twenty-fourth Day of March, 1998

Attest:

BRUCE LEHMAN

Attesting Officer

Commissioner of Patents and Trademarks

United States Patent [19]

Valleroy

[11] Patent Number: 5,615,549
[45] Date of Patent: Apr. 1, 1997

[54] THRUST REVERSER FOR A FAN-TYPE TURBOJET ENGINE

[75] Inventor: Laurent G. Valleroy, Le Havre, France

[73] Assignee: Societe Hispano-Suiza, Saint Cloud Cedex, France

[21] Appl. No.: 499,295

[22] Filed: Jul. 7, 1995

[30] Foreign Application Priority Data

Jul. 13, 1994 [FR] France ............... 94 08704

[51] Int. Cl.⁶ .............................. F02K 3/02
[52] U.S. Cl. ................ 60/226.2; 239/265.27; 244/110 B
[58] Field of Search ................ 60/226.2; 239/265.19, 239/265.25, 265.27; 244/110 B

[56] References Cited

U.S. PATENT DOCUMENTS

| 4,005,836 | 2/1977 | Mutch | 239/265.19 |
|---|---|---|---|
| 4,858,430 | 8/1989 | Belbouche | |
| 4,865,256 | 9/1989 | Durand et al. | |
| 4,894,985 | 1/1990 | Dubois et al. | |
| 4,914,905 | 4/1990 | Dubois et al. | |
| 4,916,895 | 4/1990 | Dubois | |
| 4,960,243 | 10/1990 | Dubois et al. | |
| 4,976,466 | 12/1990 | Vauchel | |
| 5,039,171 | 8/1991 | Lore | |
| 5,054,285 | 10/1991 | Geidel et al. | 60/266.2 |
| 5,058,828 | 10/1991 | Pillari | |
| 5,230,213 | 7/1993 | Lawson | 60/226.2 |
| 5,284,015 | 2/1994 | Carimali et al. | |

FOREIGN PATENT DOCUMENTS

| 2081954 | 12/1971 | France |
|---|---|---|
| 0315522 | 5/1989 | France |
| 0534815 | 9/1992 | France |
| 2142887 | 1/1985 | United Kingdom |

Primary Examiner—Charles G. Freay
Attorney, Agent, or Firm—Bacon & Thomas

[57] ABSTRACT

A thrust reverser for a fan-type turbojet engine is disclosed for use in a turbojet engine structure having an engine housing defining a primary gas flow duct and a fan housing generally coaxially arranged about the jet engine housing and defining therebetween a generally annular secondary gas flow duct. The thrust reverser has at least one thrust reverser door attached to the fan housing by a forward linkrod pivotally attached to a forward portion of the thrust reverser door and pivotally attached to the fan housing, and a rear linkrod pivotally attached to a rear portion of the thrust reverser door and also pivotally attached to the engine housing. The linkrod attaching mechanism enables the thrust reverser door to be movable between a forward thrust position wherein the door outer surface is substantially flush with an outer surface of the fan housing and a reverse thrust position wherein the thrust reverser door redirects the gases flowing through the secondary gas flow duct to provide a reverse thrust.

11 Claims, 12 Drawing Sheets

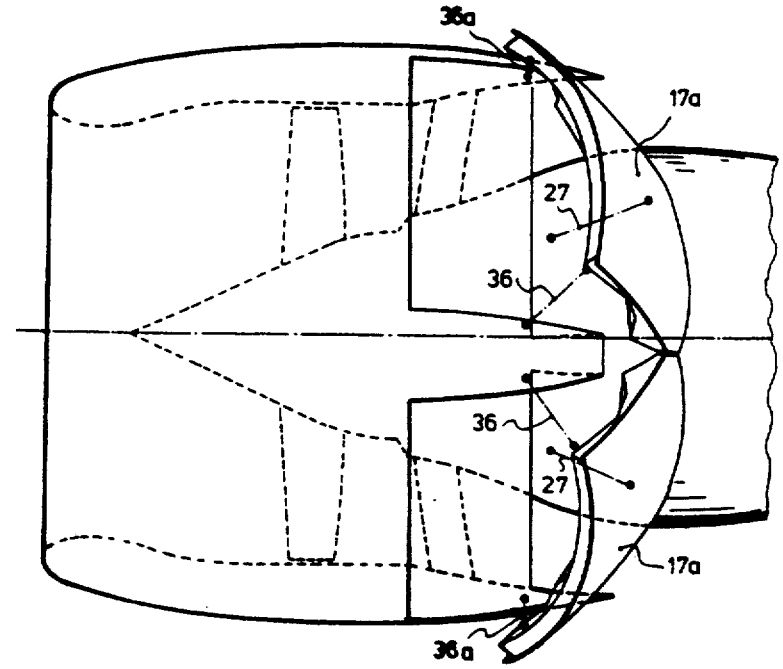

UNITED STATES PATENT AND TRADEMARK OFFICE
CERTIFICATE OF CORRECTION

Page 3 of 14

PATENT NO. : 5,615,549
DATED : April 1, 1997
INVENTOR(S) : VALLEROY

It is certified that error appears in the above-identified patent and that said Letters Patent is hereby corrected as shown below:

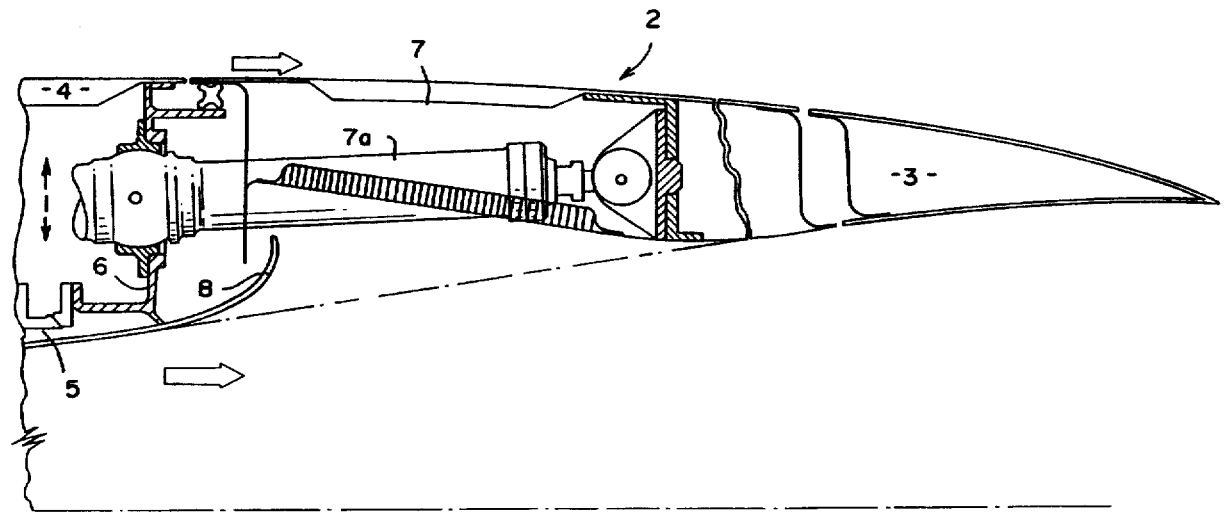

FIG. 1
(PRIOR ART)

UNITED STATES PATENT AND TRADEMARK OFFICE
CERTIFICATE OF CORRECTION

Page 4 of 14

PATENT NO. : 5,615,549
DATED : April 1, 1997
INVENTOR(S) : Valleroy

It is certified that error appears in the above-identified patent and that said Letters Patent is hereby corrected as shown below:

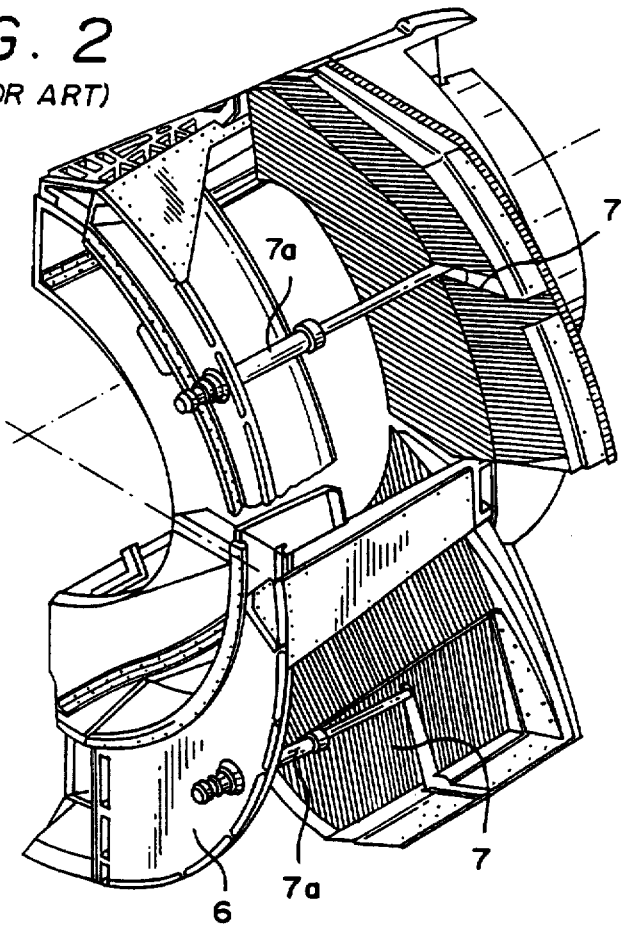

FIG. 2 (PRIOR ART)

UNITED STATES PATENT AND TRADEMARK OFFICE
CERTIFICATE OF CORRECTION

Page 5 of 14

PATENT NO. : 5,615,549
DATED : April 1, 1997
INVENTOR(S) : Valleroy

It is certified that error appears in the above-identified patent and that said Letters Patent is hereby corrected as shown below:

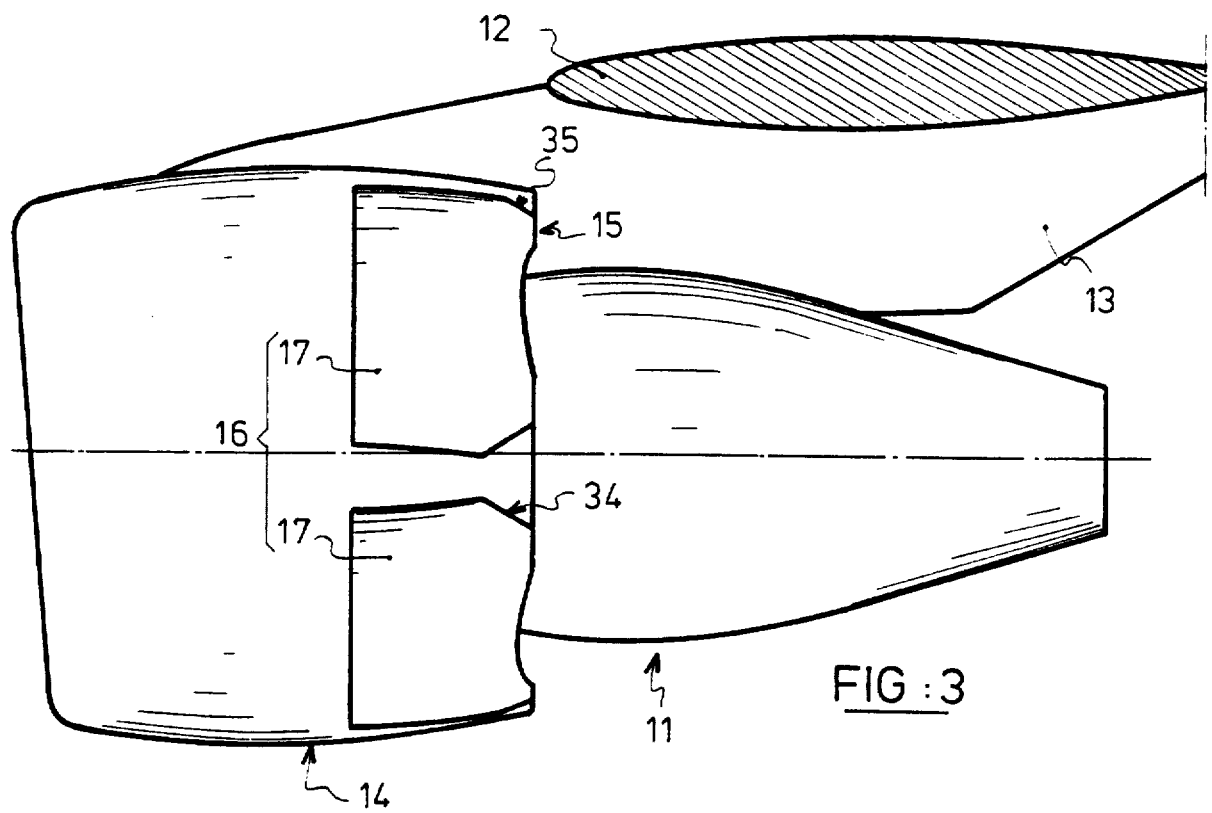

FIG : 3

UNITED STATES PATENT AND TRADEMARK OFFICE
CERTIFICATE OF CORRECTION

Page 6 of 14

PATENT NO. : 5,615,549
DATED : April 1, 1997
INVENTOR(S) : Valleroy

It is certified that error appears in the above-identified patent and that said Letters Patent is hereby corrected as shown below:

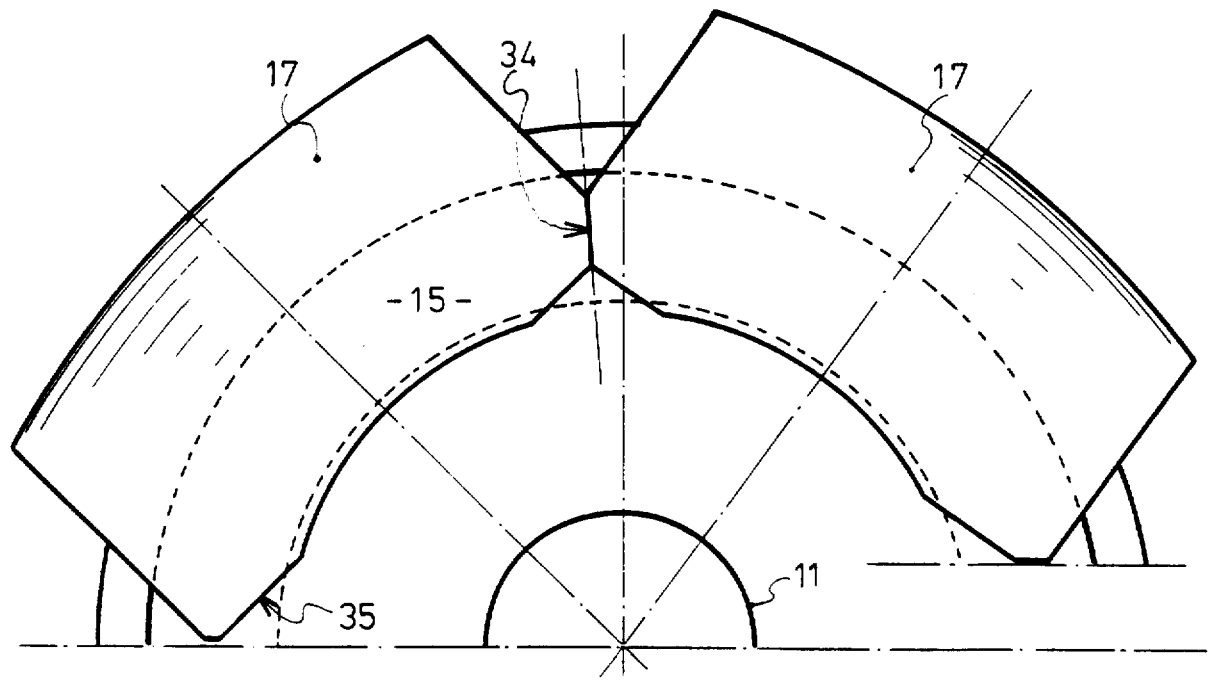

FIG: 4

UNITED STATES PATENT AND TRADEMARK OFFICE
CERTIFICATE OF CORRECTION

Page 7 of 14

PATENT NO. : 5,615,549
DATED : April 1, 1997
INVENTOR(S) : Valleroy

It is certified that error appears in the above-identified patent and that said Letters Patent is hereby corrected as shown below:

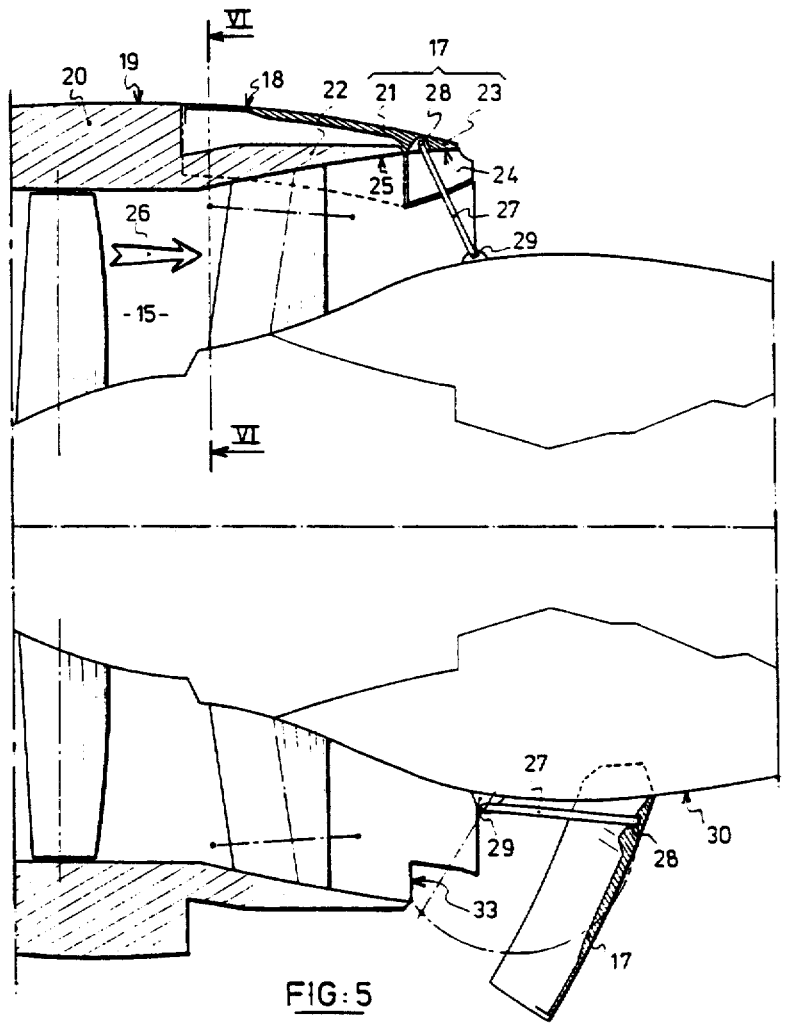

FIG:5

UNITED STATES PATENT AND TRADEMARK OFFICE
CERTIFICATE OF CORRECTION

PATENT NO. : 5,615,549
DATED : April 1, 1997
INVENTOR(S) : Valleroy

It is certified that error appears in the above-identified patent and that said Letters Patent is hereby corrected as shown below:

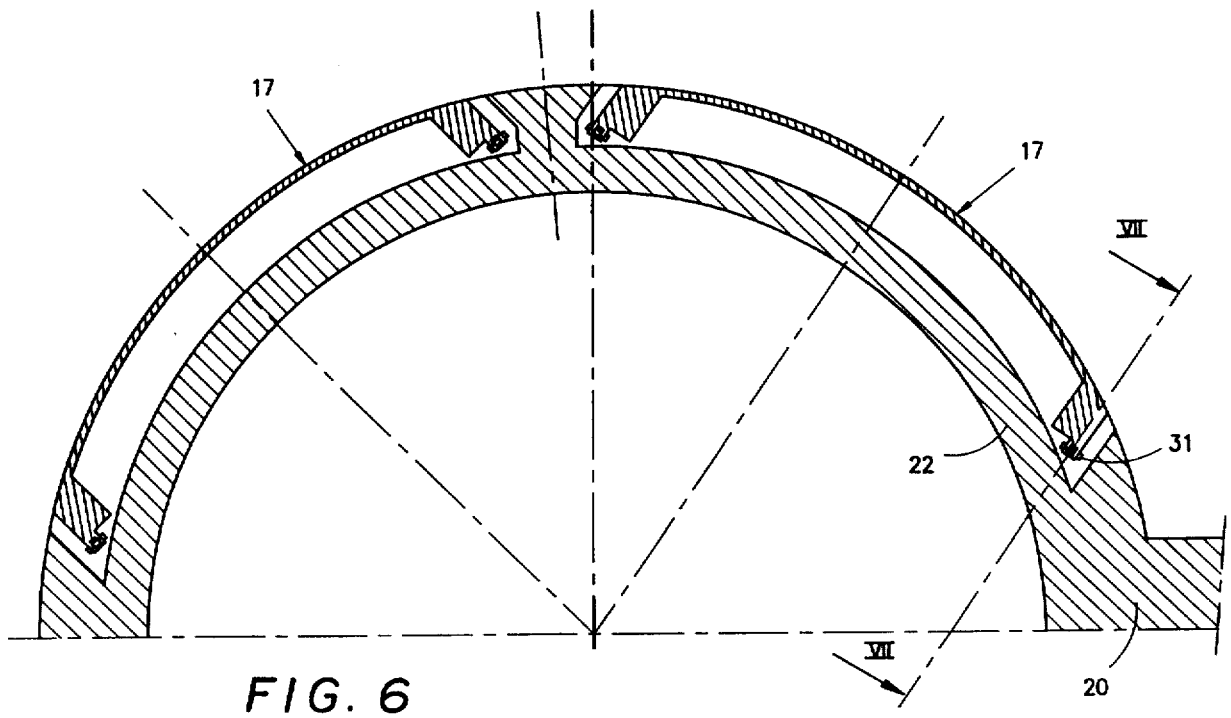

FIG. 6

UNITED STATES PATENT AND TRADEMARK OFFICE
CERTIFICATE OF CORRECTION

PATENT NO. : 5,615,549
DATED : April 1, 1997
INVENTOR(S) : Valleroy

It is certified that error appears in the above-identified patent and that said Letters Patent is hereby corrected as shown below:

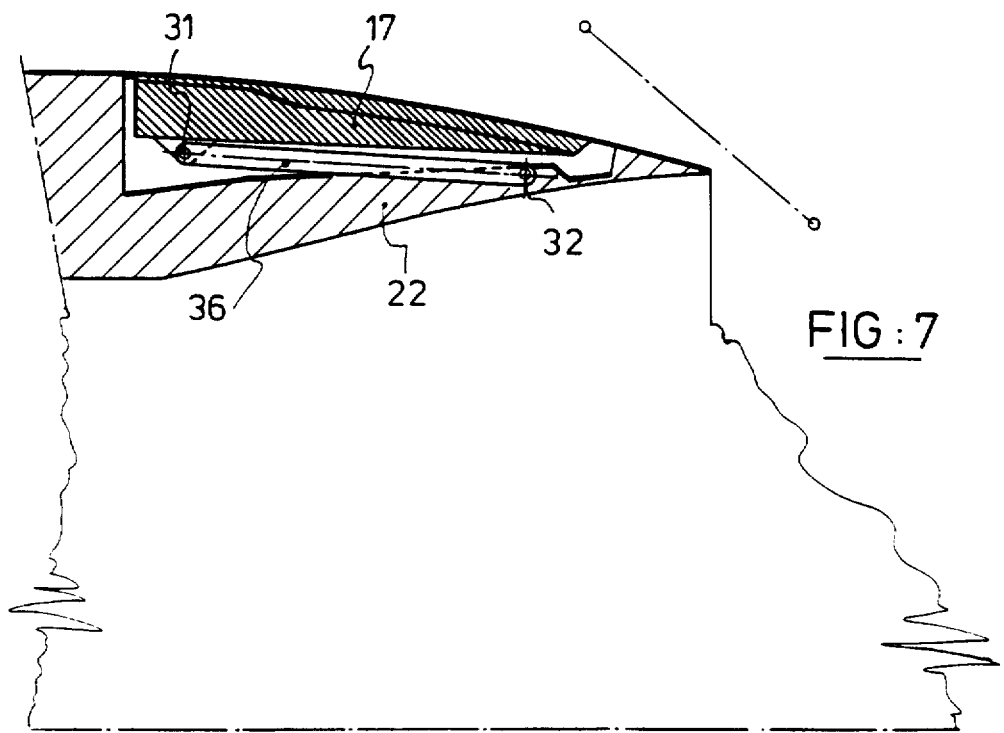

UNITED STATES PATENT AND TRADEMARK OFFICE
CERTIFICATE OF CORRECTION

PATENT NO. : 5,615,549
DATED : April 1, 1997
INVENTOR(S) : Valleroy

It is certified that error appears in the above-identified patent and that said Letters Patent is hereby corrected as shown below:

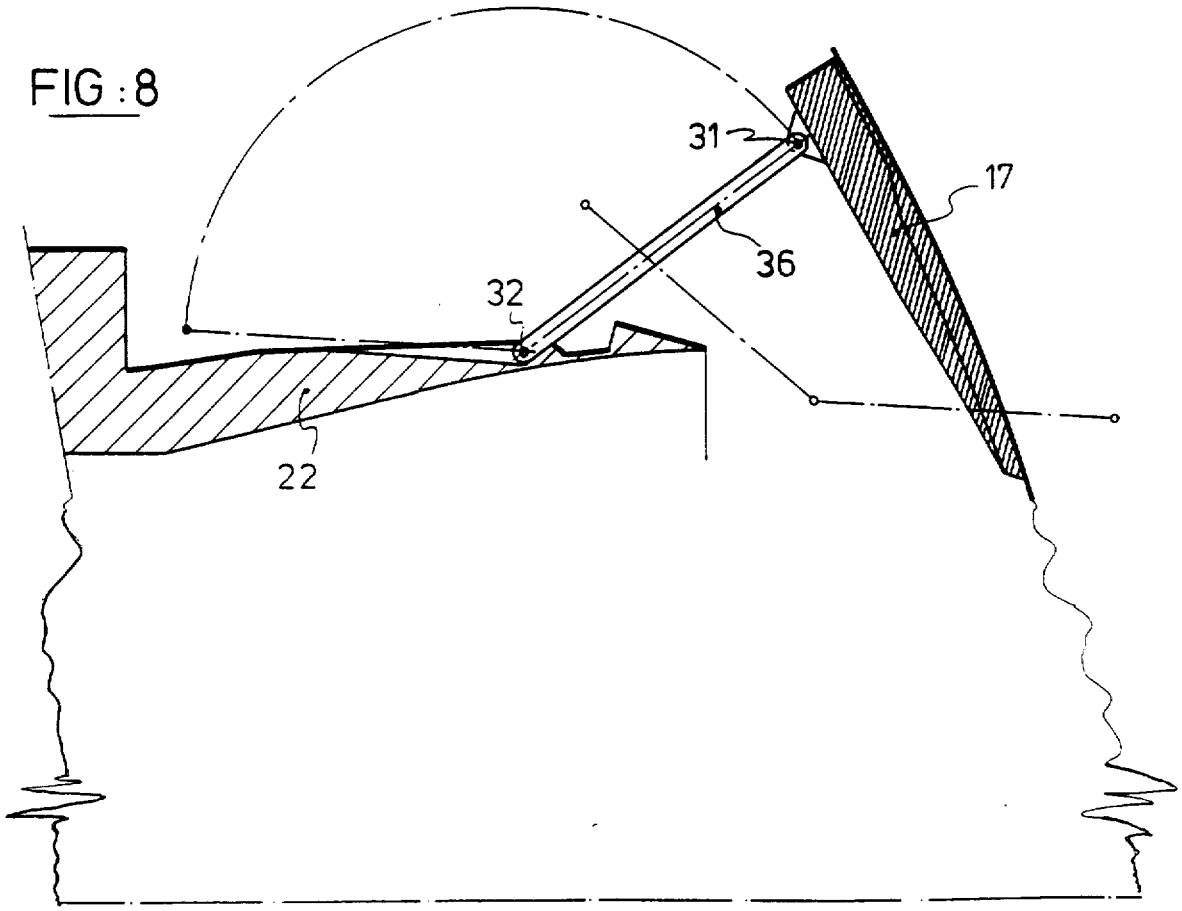

UNITED STATES PATENT AND TRADEMARK OFFICE
CERTIFICATE OF CORRECTION

PATENT NO. : 5,615,549
DATED : April 1, 1997
INVENTOR(S) : Valleroy

It is certified that error appears in the above-identified patent and that said Letters Patent is hereby corrected as shown below:

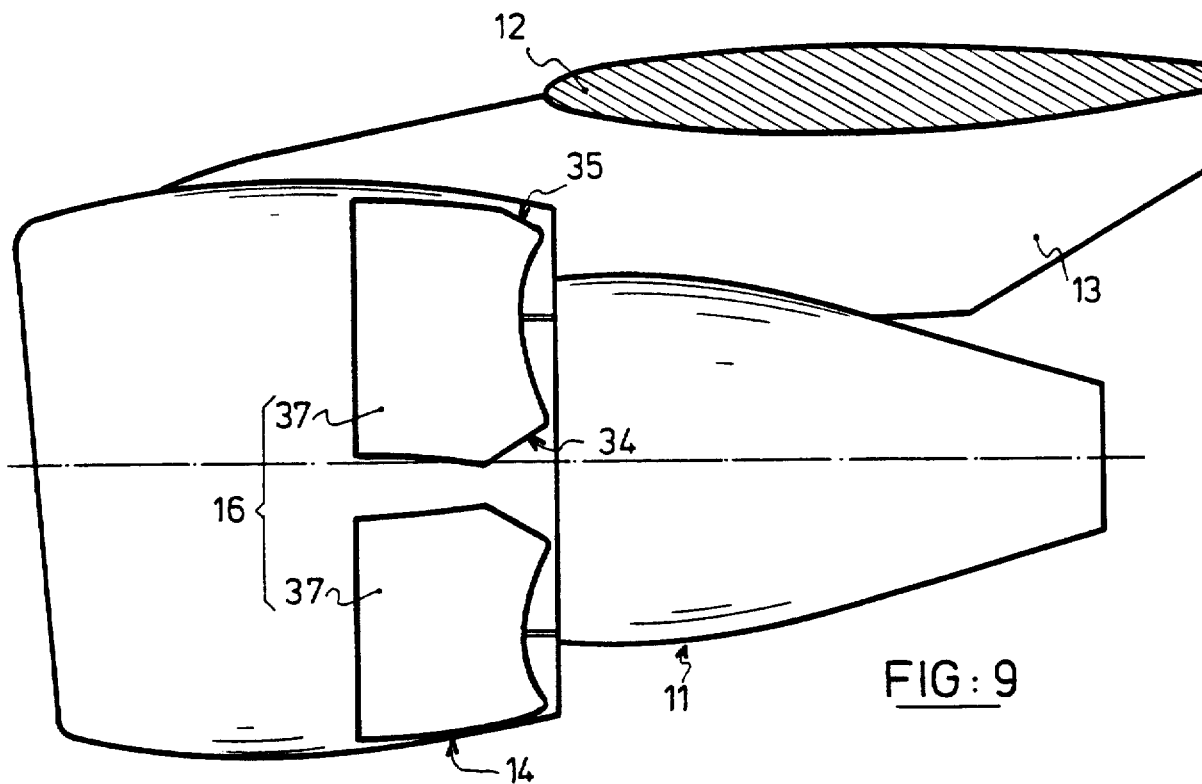

FIG: 9

UNITED STATES PATENT AND TRADEMARK OFFICE
CERTIFICATE OF CORRECTION

Page 12 of 14

PATENT NO.  : 5,615,549
DATED       : April 1, 1997
INVENTOR(S) : Valleroy

It is certified that error appears in the above-identified patent and that said Letters Patent is hereby corrected as shown below:

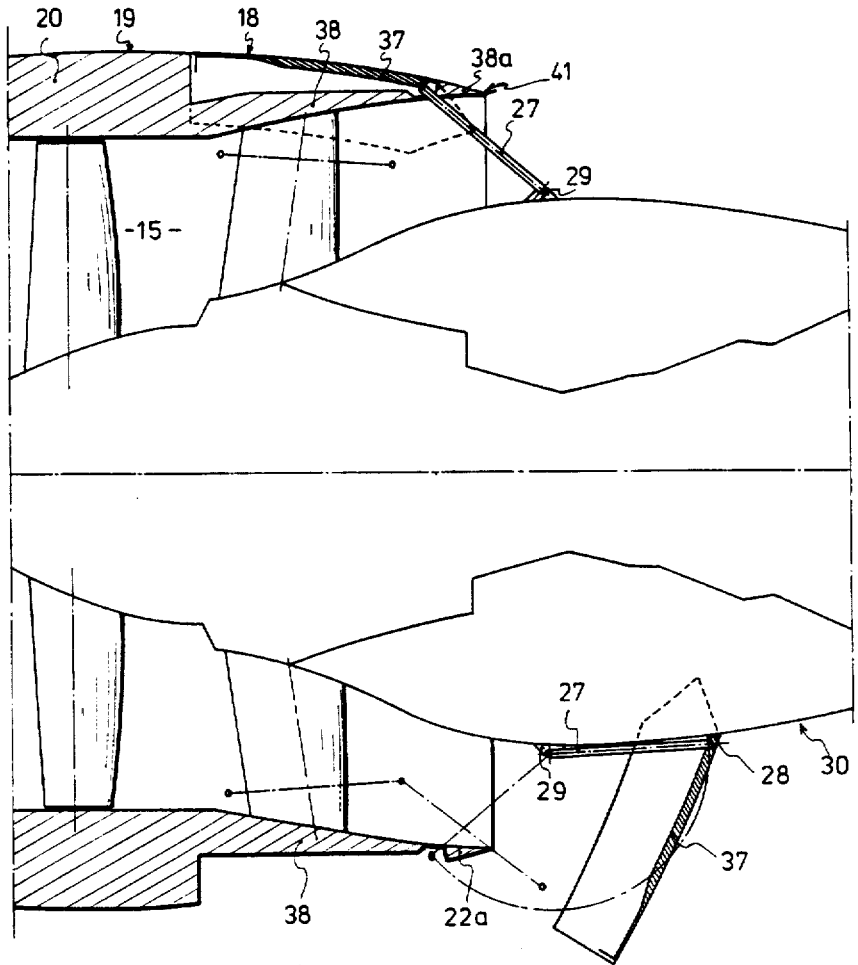

FIG.10

UNITED STATES PATENT AND TRADEMARK OFFICE
CERTIFICATE OF CORRECTION

Page 13 of 14

PATENT NO. : 5,615,549
DATED : April 1, 1997
INVENTOR(S) : Valleroy

It is certified that error appears in the above-identified patent and that said Letters Patent is hereby corrected as shown below:

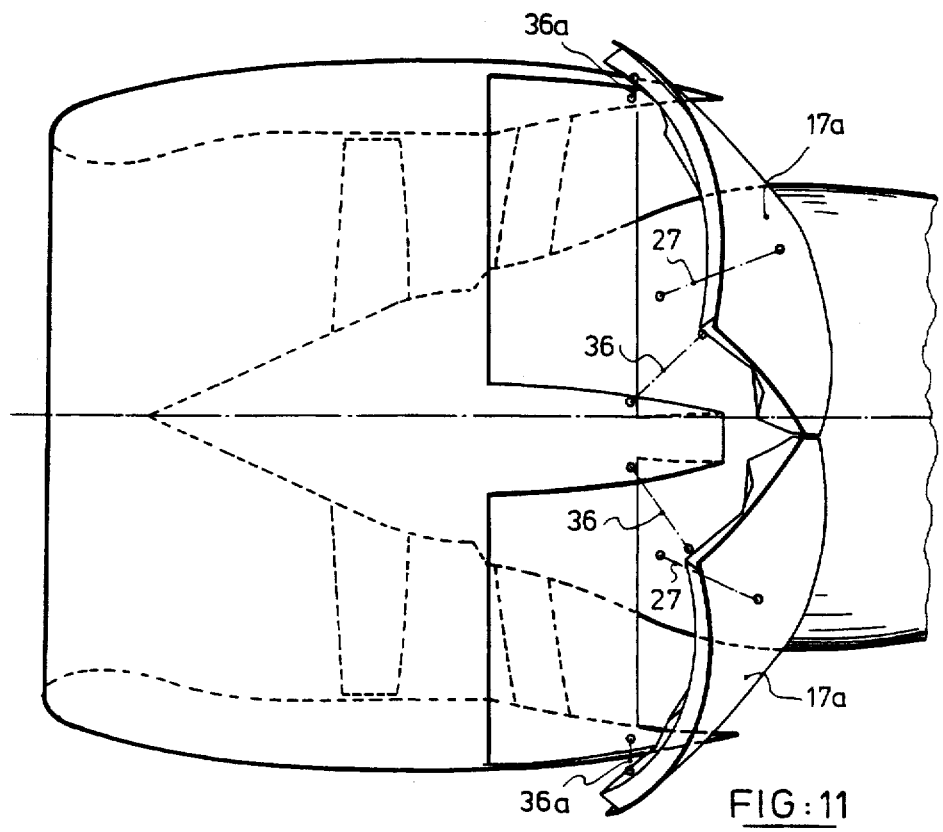

FIG:11

UNITED STATES PATENT AND TRADEMARK OFFICE
CERTIFICATE OF CORRECTION

PATENT NO. : 5,615,549
DATED : April 1, 1997
INVENTOR(S) : VALLEROY

It is certified that error appears in the above-identified patent and that said Letters Patent is hereby corrected as shown below:

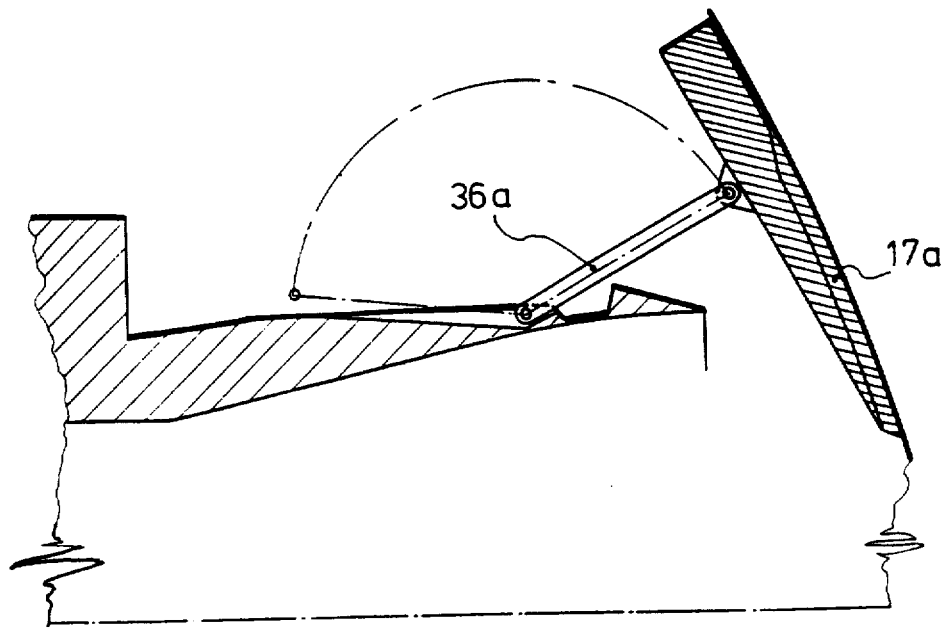

FIG : 12